Oct. 8, 1935.  F. T. ROUTERY  2,016,908

SWITCH MECHANISM FOR DIRECTION INDICATORS FOR MOTOR VEHICLES

Filed May 21, 1932  3 Sheets-Sheet 1

INVENTOR
F. T. Routery
BY E. J. Fetherstonhaugh
ATTORNEY

Oct. 8, 1935.  F. T. ROUTERY  2,016,908
SWITCH MECHANISM FOR DIRECTION INDICATORS FOR MOTOR VEHICLES
Filed May 21, 1932  3 Sheets-Sheet 2
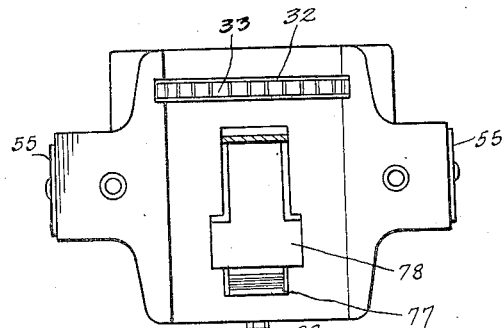
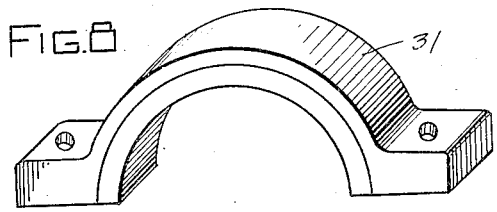
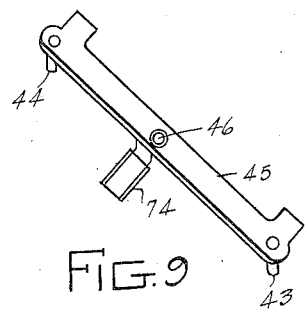
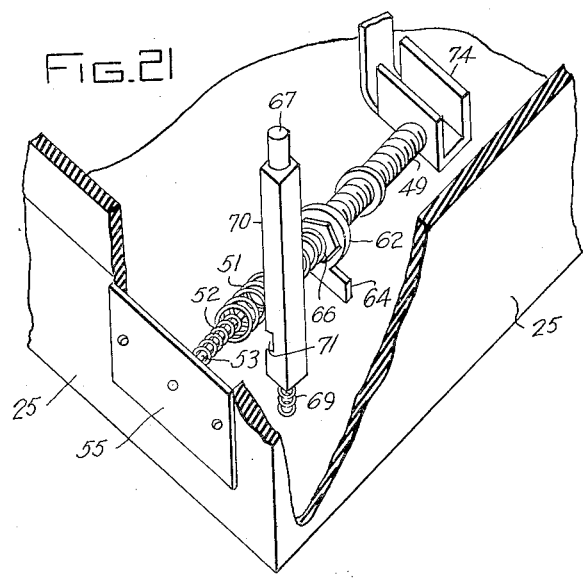
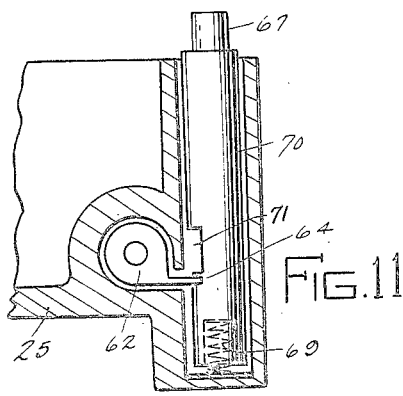
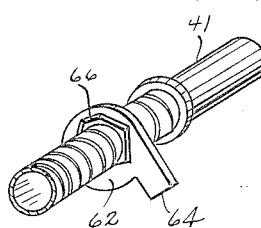
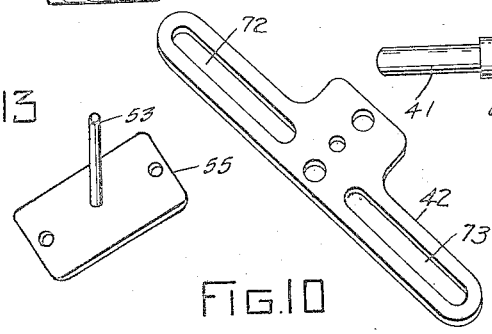
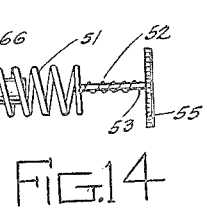
INVENTOR
F. T. Routery
By E. J. Fetherstonhaugh
ATTORNEY Oct. 8, 1935.  F. T. ROUTERY  2,016,908
SWITCH MECHANISM FOR DIRECTION INDICATORS FOR MOTOR VEHICLES
Filed May 21, 1932  3 Sheets-Sheet 3
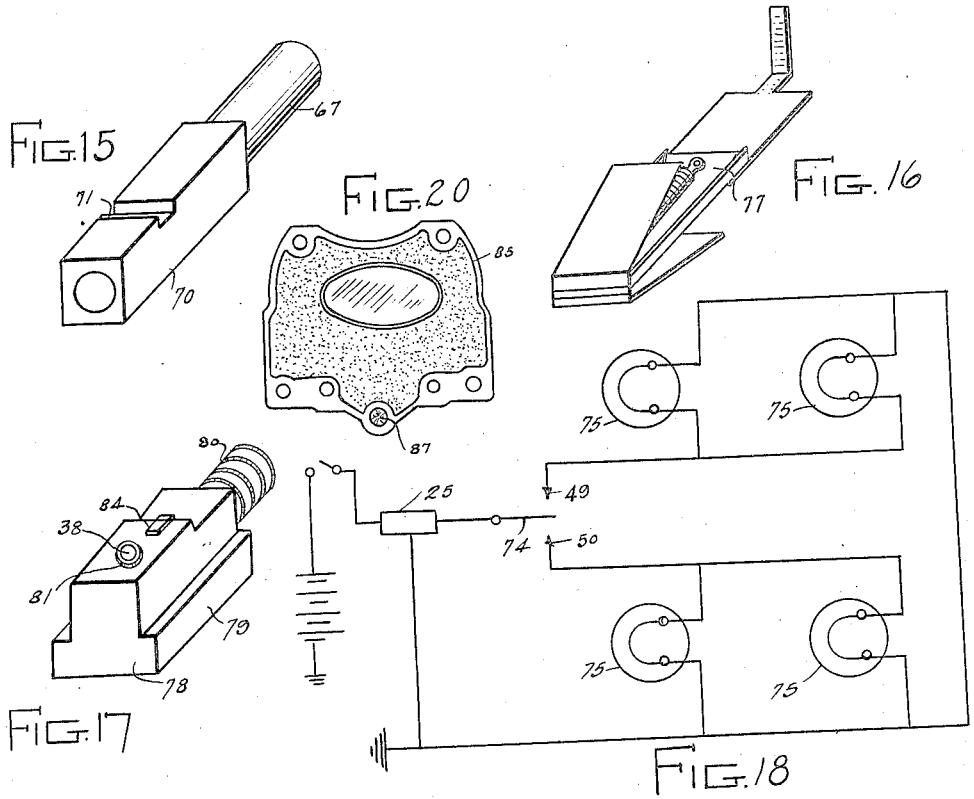
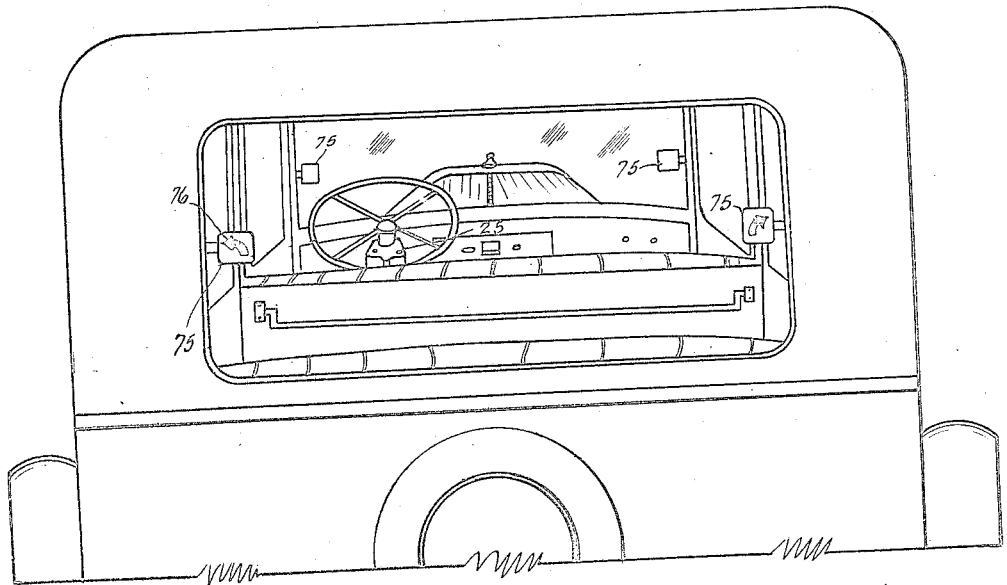
INVENTOR
F. T. Routery
By E. J. Fetherstonhaugh
ATTORNEY Patented Oct. 8, 1935

2,016,908

UNITED STATES PATENT OFFICE 2,016,908

SWITCH MECHANISM FOR DIRECTION INDICATORS FOR MOTOR VEHICLES

Francis Thomas Routery, Kingsway, Lambton Mills, Ontario, Canada

Application May 21, 1932, Serial No. 612,659

2 Claims. (Cl. 200—59)

The invention relates to a switch mechanism for direction indicators for motor vehicles, as described in the present specification and illustrated in the accompanying drawings that form a part of the same.

The invention consists essentially of the novel features of construction pointed out broadly and specifically in the claims for novelty following a description containing an explanation in detail of an acceptable form of the invention.

The objects of the invention are to provide a switch mechanism for direction indicators which can be operated manually or automatically as desired; and upon turning at intersections or other places, will automatically light the cooperating direction indicator, clearly defining to pedestrians and approaching traffic the direction in which the vehicle is about to proceed; to provide a switch mechanism which will clearly advise the operator by lighting a telltale lamp directly in view of the operator corresponding to the direction indicated by the direction indicators; to provide a switch mechanism which upon straightening of the vehicle wheels the indicator and the cooperating telltale lamp will automatically assume a neutral position; and to provide a switch which will be positive in operation, which will eliminate confusion and resulting accidents and loss of life due to misconstruing ordinary signals in practice for some years and which are subject to failures through various causes; and generally to provide a switch mechanism for direction indicators which will be attractive, compact and reliable as to its functions and efficient in operation.

In the drawings, Figure 1 is a plan view of the switch mechanism having the cover removed to disclose the working parts.

Figure 7 is an end view of the switch mechanism having the steering column clamp removed.

Figure 8 is an enlarged perspective view of the steering column cap.

Figure 9 is an enlarged perspective view of the sliding contact bar.

Figure 10 is an enlarged perspective view of the sliding contact bar guide.

Figure 11 is an enlarged cross sectional view of one of the direction indicator push button mechanisms as taken on the lines 11—11 in Figure 4.

Figure 12 is an enlarged perspective view of one of the sliding contacts with the cam mounted thereon.

Figure 13 is an enlarged perspective view of the plate conductors.

Figure 14 is an enlarged side elevation of the sliding contact assembled and with springs and plate conductors in position.

Figure 15 is an enlarged perspective detail of one of the push buttons.

Figure 16 is an enlarged perspective view of the interrupter.

Figure 17 is an enlarged perspective view of the gear mounting.

Figure 18 is a diagrammatic view of the electrical circuit.

Figure 19 is a perspective view of a motor vehicle showing the switch mechanism and direction indicators attached thereto.

Figure 20 is a plan elevational view of the switch casing cover.

Figure 21 is a diagrammatic view of one of the pre-warning push buttons in operation and showing one of the sliding contacts in operation.

Like numerals of reference indicate corresponding parts in the various figures.

Figure 1:
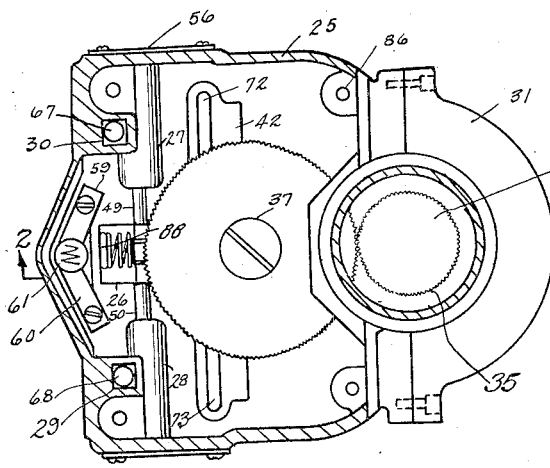
Figure 4:
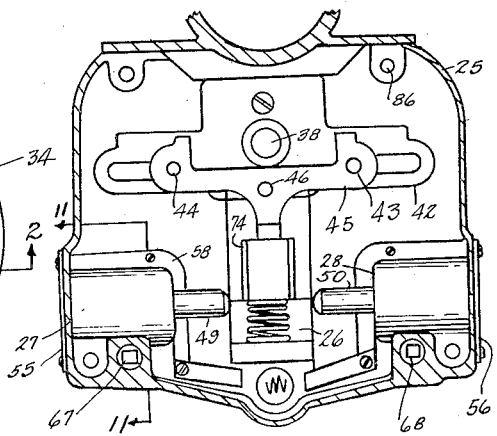
Figure 4 is a fragmentary plan view of the switch mechanism having the cover and the driven gear wheel removed.

Referring to the drawings, the casing indicated by the numeral 25 is formed with an underside recess 26 for the battery connections with right and left sliding contact chambers 27 and 28 and right and left push button passages 29 and 30 respectively, the upper wall of the casing is formed together with the cap 31 into a pillow block type of shaft orifice for the steering post, the upper wall of the casing having the slot 32 through which the operating gear 33 extends to engage with the steering post 34, the steering post 34 being roughened or knurled at 35 to coact with the gear 33. The gear 33 is mounted on the pivot bearing 36 and held in position by the binding post 37 screwed into the orifice 38 and connecting with the conducting spring 39 reaching into the underside recess 26 containing the connections to the battery, the hub 40 of the gear 33 has the conducting lining 41 coacting with the binding post 37 in effecting a ground connection with the steering post 34. The guide bracket 42 is fixedly secured and elevated above the bottom of the casing and this guide bracket forms a conductor connected to the battery connections and a support for the guide pins 43 and 44, these pins 43 and 44 extending downwardly from a sliding bar 45 mounted in the guide bracket 42 and having an upwardly projecting pin 46 engaged by the hub 48 of insulating material particularly in the slot 48 in the said cam, this hub being secured to the inner side of the gear 33 and mounted on the lining 41.

The sliding bar 45 has the guide pins 43 and 44 which extend downwardly between the guide slots 72 and 73 of the guide bracket 42 and the oscillating contact member 74 extending from the sliding contact bar 45 between the sliding contacts 49 and 50 in the chambers 27 and 28 respectively, these contacts 49 and 50 have respectively, the springs 51 and 52 at the outer ends centered by the pins 53 and 54 extending outwardly from the plate conductors 55 and 56 secured to the outside of the casing one on either side, screws connecting these plate conductors electrically joining them to the conducting strips 57 and 58 secured to the bottom of the casing by the connecting strips 59 and 60 on either side of the deflector light bulb 61, the cams 62 with the tails 64 are screwed onto the outer portions of the sliding contacts 49 and 50 and definitely locked by the nuts 66 in the desired place and these cams in operation are adapted to protrude into the push button passages 29 and 30 and to co-act with the push button bars 70 and the slot 71 to hold or release the sliding contacts 49 and 50, the push buttons 67 and 68 operate in the push button passages 29 and 30 respectively and have the springs 69 which extend from the bottom of the passages 29 and 30 into the orifice 90 provided in the push button bars 70, the springs hold the push button bars in their normal position, that is, with the tails 64 and 65 against the body portion of the bars 70 below the slot 71, when the bars 70 are manually operated the tails 64 and 65 are released by means of the slot 71 and being integral with the sliding contacts 49 and 50 are forced in a transverse direction to make contact with the oscillating contact 74 to close the circuit.

These cams 62 and 63 are adjustable on the sliding contacts 49 and 50 for regulating the position of the neutral zone with relation to the oscillating contact members 74 of the contact bar 45 and the sliding contacts 49 and 50 which has the effect of narrowing or widening the neutral or off position of the oscillating contact member 74.

The direction indicators 75 having the turned arrows 76 electrically illuminated and are so connected that in operation they will flash intermittently which is accomplished through the use of an interrupter 77 situated in the underside recess 26 of the casing 25 and held in position by means of the gear mounting 78 also fitting in the recess 26.

The gear mounting 78 is formed of an insulated body 79 and has at one end the coil spring 80 which acts as a double purpose, one purpose is that it keeps the gear 33 tensioned against the steering post 34 which is accomplished by the pressure of the spring against the end wall of the recess 26 and as the gear mounting 78 and the operating gear 33 are held together by the binding post 37 the operating gear 33 is naturally held against the steering post 34. The other purpose of the coil spring 80 is the way in which it forms an electric contact with the interrupter 77 as the electric current from the battery connections 83 leads into the interrupter and from the interrupter to the coil spring 80 to the contact 84 which is connected to the guide bracket 42 made of conductive material and which completes the circuit.

The spring 80 which is journalled within the recess at one end of the gear mounting 78 abuts the end wall of the recess 26 formed in the casing and forms a contact with the spring end 88 of the interrupter 77.

The spring 80 keeps the gear mounting 78 in tension and as this gear mounting forms a support for the guide bracket 42 it is held tightly in position through the latter against the other end wall of the casing due to the fact that the guide bracket having the guide slots 72 and 73 abuts the end wall of the casing and as the gear 33 is secured to the binding post 37 screwed into the orifice 38 of the gear mounting, it is kept in constant engagement with the steering post of the vehicle.

The sliding bar 45 having the guide pins 43 and 44 engaging with the guide slots 72 and 73 of the guide bracket 42 has a projecting pin 46 which engages with the slot of the hub 40 which forms an integral part of the underside of the gear wheel 33 and this sliding bar has a projecting contact member 74 which is adapted to abut one or other of the sliding contacts 49 and 50 upon the movement of the gear wheel which immediately moves the sliding bar one way or the other according to the requirements.

It will therefore be seen that when it is desirous of giving a pre-warning signal, by pressing down on one of the push buttons, as for example, push button 67, which has a tension spring 69 at the base, within the vertical recess passage 30, this has the effect of releasing the cam 62 carrying the lug 64 which previous to that movement abuts against the wall of the push button immediately below the slot 71 thereof, and when the push button is pushed downwardly, naturally the lug 64 will spring forward owing to the fact that it is held against the plate conductor 55 by the springs 51 and 52 and as the lug is propelled forwardly, it fits within the slot 71 of the push button and the sliding contact 49 extends outwardly beyond the sliding contact chamber 27 for engagement with the sliding contact bar 45 to complete the circuit, and the lug 64 is not released from within the recess 71 until the gear wheel 33 is moved sufficiently to press the oscillating contact member 74 of the sliding bar against the sliding contact 49 and as this pressure is against the springs 51 and 52, the lug 64 will immediately be pressed back out of the recess 71 of the push button and as it is moved out of the recess, the push button will immediately be pressed upwardly owing to the tension spring 69 which is situated at the base of the push button and therefore the push button will again be ready for use, when another signal is required to be given.

In automatically giving the signal, through the rotation of the gear wheel 33, the oscillating contact of the contact bar 45 will press against one of the sliding contacts, such as 49, thereby completing the circuit for illuminating the required direction indicator.

When the pre-warning signal has already been given, through the rotation of the gear wheel which will move the oscillating member 74 against the sliding contact 49 or whichever side the pre-warning signal has been given, by pressing back the sliding contact, this will immediately reset the push button, in other words, the lug on the sliding contact will disengage with the recess of the push button thereby permitting the latter to be pressed upwardly due to the spring situated therebeneath, and therefore the push button is again ready for the next manual operation.

The cover 85 closes in the operating parts of the switch and is secured to the casing by means of the screws 86 and has a colored glass 87 which is adapted to fit over the deflector bulb in the casing so as to enable the operator or other person to know whether the bulb is illuminated or not within the casing.

In the operation of the invention, the knurled or roughened steering post coacts with the gear wheel and moves the contacts on the battery side to the sliding contacts and as the sliding contacts engage the pin contacts the electrical connection to the lights is made through the plate conductors on either side, one at a time, to the inside plate conductors from which suitable connections are made to the lights and coincidently the detector light is energized and shows through the red glass directly under the eyes of the driver.

In traffic, naturally the direction must be indicated to the other drivers prior to starting the turn. Usually the drivers of the motor vehicles have to wait for the light or the traffic officer to start their vehicles at an intersection and during the stop, the driver puts out his arm or in some manner satisfactory to the laws of the community, shows which way he is going, or that he intends to make a turn, consequently, it is not soon enough to indicate by the arrows in this particular direction signal through the automatic movement of the contacts by means of the steering wheel as this has not yet been turned, therefore one of the buttons is operated which presses the contact member on the sliding contact bar and this brings this sliding contact member into engagement with the contact 74 operable by the gear wheel, that is to say, it moves the sliding contact member inwardly, but the guide pins are still in engagement with the guide slots of the guide bracket, therefore the electric current flows to the plate as if the gear had been operated.

It will be noticed that in one case, namely the automatic operation, the gear moves a switch contact from the battery side to the sliding contact on the light side, and in the manual operation, the sliding contacts from the light side move to the gear operated contacts on the battery side, and in the former case the re-adjustment is accomplished by the turning of the gear in just the same manner as it would be in the automatic operation.

It will be noted that the sliding contacts are driven outwardly through the rotation in each case of a cam member adjustably secured on the threaded portion. These sliding contacts are always held in connection with their pin contacts or conductors, and the current is transmitted by these pin conductors through the plates secured to the outside of the casing to the plate conductors within the casing.

The push buttons effect the operation of the sliding contacts by releasing the tails 64 of the cams by means of the slot 71, then the sliding contact spring is released through the pushing down the push button and this sliding contact slides into engagement with the movable contact 74. On rotation of the gear the contact member 74 returns the push button to its normal position, consequently when the gear is operated, by the turning of the steering post, the tail 64 of the cam 62 is forced back and passes through the slot 71 of the push button bars 70 and locked in that position (Figure 11) until the device is again manually operated. The deflector light bulb being connected with both the left and right signal circuits will immediately be energized by one or the other according to the manipulation of the vehicle or the pre-warning signals so that the operator of the vehicle will always know whether his signals are in proper working order.

Figure 2:
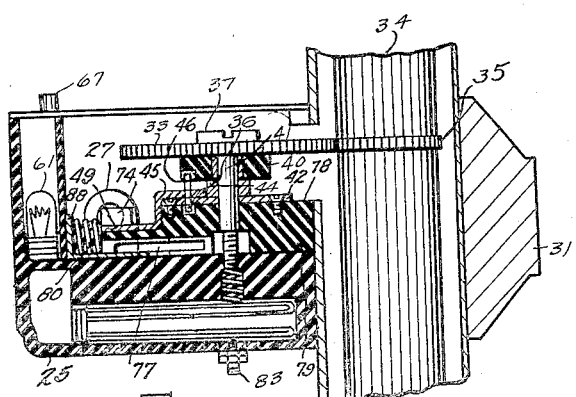
Figure 2 is a cross sectional view of the switch mechanism taken on lines 2—2 in Figure 1.
Figure 6:
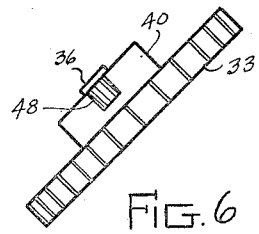
Figure 6 is an enlarged perspective view of the driven gear.
Figure 3:
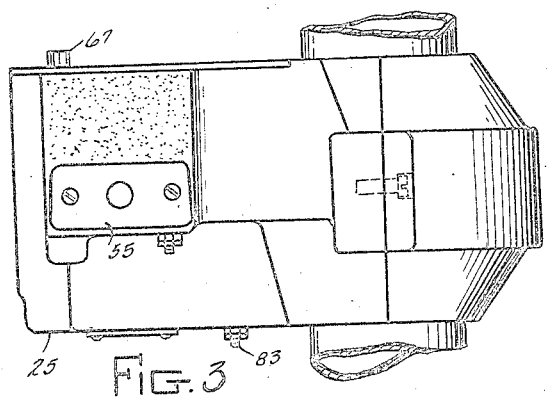
Figure 3 is a side elevation of the switch mechanism as applied to the steering column of a vehicle.
Figure 5:
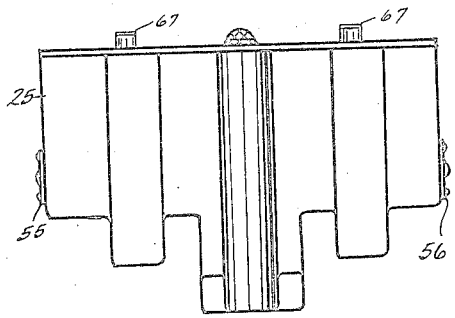
Figure 5 is an end view of the switch mechanism.

The sliding contacts 49 and 50 are adjustable in relation to the moving contact 74. In other words the steering post of one car may be of a larger or a smaller diameter than that of another car, necessitating an adjustment on the contact bars 49 and 50. It will be noticed in Figures 1 and 2 that the movable contact 74 is in a neutral position, that is, it is not in contact with either of the contacts 49 and 50, and this is the case naturally when the car or other vehicle is travelling in a straight line. To make this adjustment then depending on whether the neutral zone is to be lessened or increased as the case may be, the contacts 49 and 50 are provided with a threaded portion upon which the cam 62 is mounted and when these cams are turned on this thread, it has the effect of drawing in or moving out the ends of the sliding contacts 49 and 50 increasing or decreasing the clearance between the contacts themselves and the movable contact 74. It will therefore be seen from the foregoing and particularly in Figure 1, in making a left turn, the steering post 34 will revolve in a clockwise direction and the operating gear 33 in a counter-clockwise direction, and through the mechanism before described, force the moving contact 74 to the left, making contact with 49 and forcing it outwardly as the turn is being negotiated. If the turn being made is at right angles, as at an intersection in cities and towns, the contact 49 will be forced out by the contact 74 until it locks behind the push bar 70 as before described. In that case, after the car is on the straightway the push button 67 is operated which re-sets the device until it is needed for future signalling. A right hand turn would be exactly the same except the sliding contact 50 would contact with 74 to operate the signals on that side of the vehicle.

What I claim is:—

1. In a switch mechanism for direction indicators for motor vehicles, a switch mechanism suitably secured to a steering column and comprising a gear wheel and hub coacting with the steering post in rotation, a suspended electrical contact slidably mounted in a bracket and operated by said gear, spring-held plungers having cams and adapted to be operated through the movement of said suspended electrical contact, push buttons spring-held within compartments at right angles to said plungers and having recesses adapted to be engaged by the lugs of said plungers and forming manual means for engaging said plungers with the slidable contact and adapted to be reset by the operation of said gear.

2. In a switch mechanism for direction indicators for motor vehicles, a switch mechanism suitably secured to a steering column and comprising a gear wheel having a hub and recess therein coacting with the steering post in rotation, a suspended electrical contact slidably mounted in a bracket and operated by said gear, a gear mounting resiliently supporting said gear wheel and bracket, a pair of spring-held plungers having cams and adapted to form a contact with said slidable contact, push buttons forming manual means adapted to release the cams of said plungers and reset by the operation of said gear.

FRANCIS THOMAS ROUTERY.